L. G. WOODS.
CAR WHEEL.
APPLICATION FILED MAY 5, 1909.
950,501.
Patented Mar. 1, 1910.
FIG. 1
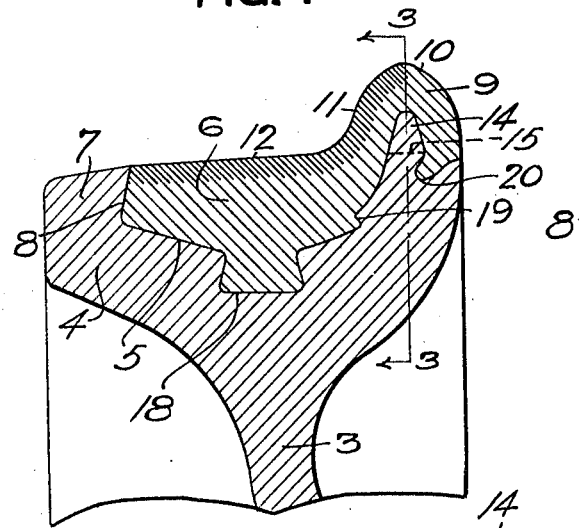
FIG. 4
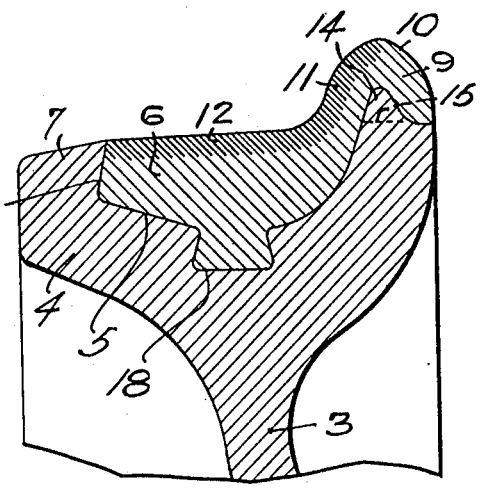
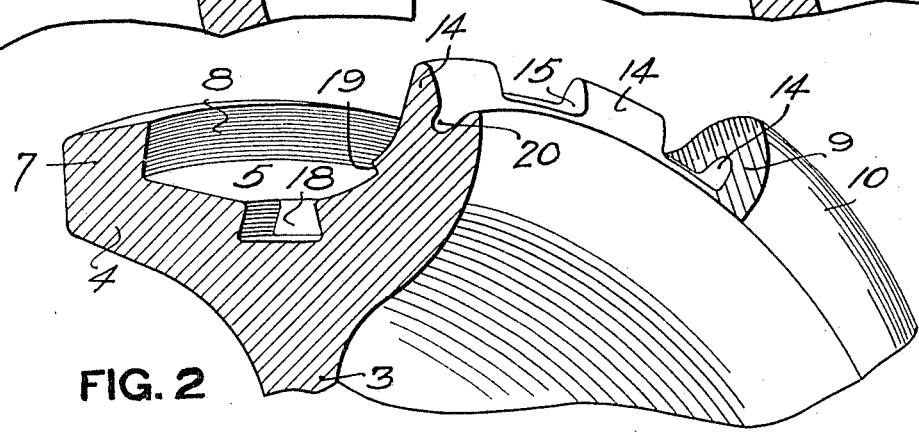
FIG. 2
FIG. 3
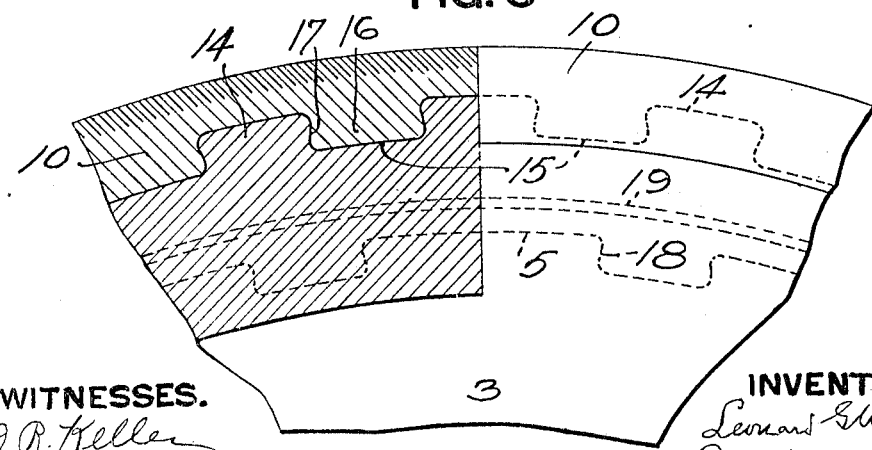
WITNESSES.
J. R. Keller
Robert C. Potter
INVENTOR.
Leonard G. Woods
By Kay & Totten
Attorneys

UNITED STATES PATENT OFFICE.

LEONARD G. WOODS, OF PITTSBURG, PENNSYLVANIA.

CAR-WHEEL.

950,501. Specification of Letters Patent. Patented Mar. 1, 1910.

Application filed May 5, 1909. Serial No. 494,173.

*To all whom it may concern:*

Be it known that I, LEONARD G. WOODS, a resident of Pittsburg, in the county of Allegheny and State of Pennsylvania, have invented a new and useful Improvement in Car-Wheels; and I do hereby declare the following to be a full, clear, and exact description thereof.

My invention relates to car wheels, its object being to provide a car wheel having a strong tough body, a hard wearing surface on the rim and flange.

In an application filed by me on April 15th, 1909, Serial No. 419,179, I have described and claimed a car wheel having its rim and flange integral with the wheel body and formed of soft tough metal and having a separately formed sleeve or wearing surface of hard metal secured upon the rim and the inner face of the flange.

The present invention relates to a wheel of this same type, and it consists, generally stated, in a wheel having a soft tough metal body, facing for the tread and flange made of hard metal and extending entirely around the flange so as to do away with any joint in the face of the flange subjected to wear; as well as other improvements relating to the support of the hard metal face in the flange portion of the wheel.

In the accompanying drawing Figure 1 is a cross section of a wheel embodying the invention; Fig. 2 is a detail sectional perspective thereof; Fig. 3 is a side view and section on the line 3—3 Fig. 1; and Fig. 4 is a view of a modification of the invention.

The body of the wheel is formed of strong tough metal suitable for the purpose, the object being to form the same as strong as practicable to sustain the great strains brought upon car wheels both in carrying the load and also in sustaining the side strain brought upon the flange. I may employ for the body of the wheel any suitable metal, for example a soft tough steel of low carbon which may be strengthened by any suitable alloy to produce as strong and tough a body as practicable, which may be formed either by casting or forging as desired. The main body of the wheel has the web 3 and the rim 4, and has formed in its face an annular seat 5 for the reception of the hard metal facing 6 which may be formed of any suitable material having high wearing qualities, for example chilling cast iron or a hard high carbon steel or steel alloy. It is preferably formed of chilling cast iron having the general characteristics as hereafter described. The seat 5 extends entirely around the tread portion of the rim of the wheel and at its outer edge the body has the lip portion 7 extending up to the tread line of the wheel, this providing the dove tail face 8 to hold the hard metal facing. This hard metal facing extends entirely around the flange portion of the wheel so that there is no seam or joint in the exposed surface of the hard metal facing, the joint in the flange portion between the hard metal facing and the wheel body being located at a point on the outer face of the flange and away from the ordinary inner wearing face thereof on which the greatest wear naturally comes in service. The outer facing 9 of the flange 10 is thus made of the same metal as the inner facing 11 and the main tread facing 12.

When the facing is made of chilled cast iron I prefer to chill only the main tread wearing face 12 and the inner face 11 of the flange as indicated in the sectioning thereof, the chilling action extending for a suitable depth while the metal back of the same and that forming the outer facing 9 remains unchilled and of full original strength of the cast iron. This thus provides the hard surface proper for wearing in the place most needed while preventing the necessity of forming any metal joint on the face of the flange subjected to wear. As shown in the drawings while the hard metal surfacing covers the entire flange face the flange itself is also supported by the tough strong metal of the body and for that purpose I provide the body portion with the flange projection 14 extending about half the depth of the flange and so providing for the strengthening of the flange itself by the tough metal of the body. In order to bind together the outer facing of the flange, however, I form depressions 15 in such flange projection 14 into which the hard metal forming the facing of the car wheel enters as at 16 so that where these depressions 15 are formed in the flange projection 14 the hard metal of the flange is continuous from its inner to its outer face, so binding the metal together and giving much greater strength than if the metal was simply a thin annular facing. The depressions 15 are also preferably made dove tail, as at 17, so that the hard metal filling 16 shall hold within such depressions and aid in holding the facing on the wheel if it is not sufficiently fused to the body portion. I also provide for the mechanical holding of the hard metal facing to the wheel, employing in addition to the dove tail seats or pockets 18 formed at intervals in the body directly below the tread of the wheel as described in said application Serial No. 419,179, suitable inclosed continuous dove tail faces for holding the hard metal surfacing, for example, coöperating with the dove tail face 8 of the outer projection 7 I employ the dove tail 19 in the seat 5 of the body portion which acts with the dove tail 8 to hold the body of the hard metal facing within said seat, this dove tail 19 being, as shown, entirely inclosed within the hard metal facing. In addition to this, to hold the flange facing 10 in place I form in the outside of the flange projection 14 the continuous dove tail 20 into which the hard metal face may flow, the dove tails 19 and 20 which are both inclosed in the hard metal facing acting together to bind the flange facing 10 to the wheel body.

By the above construction it will be seen that I provide full means for binding and holding the hard metal facing to the tough metal body not only through the dove tail pockets 18 but by the continuous dove tails 8 and 19 and 20, so firmly binding the hard metal facing to the body both on tread face and continuously around the flange. The hold of the hard metal facing upon the flange is strengthened by the hard metal filling, the depressions 15 of the flange acting with said dove tails. While I do away with any joints on the inner face of the flange I fully strengthen the same by the strengthening flange projections 14 and I also am enabled to employ the hard metal facing on the outer face of the flange as well as on its inner face. While continuous dove tail means are employed for binding the hard metal facing to the tough body, these are in large part inclosed within the hard metal facing and are therefore protected from chipping action at the edges of the dove tails. The same general principles are carried out in connection with the modification shown in Fig. 4. In this case the advantages of the continuous hard metal facing on tread face as well as both flange faces and the strengthening of the flange portion by the flange projection over the tough body portion are all present though in somewhat simpler form.

What I claim is:

1. A car wheel having its body portion of tough metal and having a separately formed wearing surfacing of hard metal forming the tread face and extending entirely around the flange.

2. A car wheel having its body formed of tough metal and provided with a strengthening projection extending up into the flange portion and having a wearing facing of hard metal forming the tread and extending entirely around the flange and enveloping such strengthening projection of the body.

3. A car wheel having a body portion of tough metal and a separately formed facing of chilling cast iron forming the tread face and extending entirely around the flange, said metal being chilled on the tread face and inner face of the flange but unchilled on the outer face of the flange.

4. A car wheel having a tough metal body provided with a strengthening projection entering within the flange portion thereof, and a facing of chilling cast iron, said facing covering the tread and extending entirely around the flange and inclosing such strengthening projection, the tread face and inner face of the flange being chilled but the outer face of the flange being unchilled.

5. A car wheel having its body portion of tough metal and having a projection extending within the flange portion having recesses in said projection, and an outer facing of hard metal forming the tread face of the wheel extending entirely around the flange and enveloping said flange projection of the body and entering within the recesses thereof.

6. A car wheel having its body portion of tough metal and having a projection extending within the flange portion having dove tail recesses in said projection, and an outer facing of hard metal forming the tread face of the wheel, and extending entirely around the flange and enveloping said flange projection of the body and entering within the recesses thereof.

7. A car wheel having a tough metal body provided with a depression in its face and an outer lip portion extending out to the tread, the inner face of the lip being dove tailed, and having a continuous dove tail seat within said depression, and a hard metal facing covering the tread and inner face of the flange and held by said dove tails and inclosing such continuous dove tail in the depression.

8. A car wheel having a tough metal body provided with a flange projection thereon and a surfacing of hard metal inclosing said flange projection, the body portion having a dove tail at the base of said projection and the hard metal surfacing entering said dove tail and inclosing the same.

9. A car wheel having a tough metal body provided with a flange projection thereon with recesses in said flange projection, and a surfacing of hard metal inclosing said flange projection, the body portion having a dove tail at the base of said projection and the hard surfacing metal entering said dove tail and said seats in said projection.

In testimony whereof, I the said LEONARD G. WOODS have hereunto set my hand.

LEONARD G. WOODS.

Witnesses:
R. J. BROWN,
CHAS. S. FOLLER.